(12) United States Patent
Hoellwarth (10) Patent No.: US 8,972,437 B2
(45) Date of Patent: Mar. 3, 2015

(54) AUTO-POPULATION OF A TABLE

(75) Inventor: Quin C. Hoellwarth, Kuna (ID)

(73) Assignee: Apple Inc., Cupertino, CA (US)

(*) Notice: Subject to any disclaimer, the term of this patent is extended or adjusted under 35 U.S.C. 154(b) by 462 days.

(21) Appl. No.: 12/646,885

(22) Filed: Dec. 23, 2009

(65) Prior Publication Data
US 2011/0153647 A1 Jun. 23, 2011

(51) Int. Cl.
*G06F 17/30* (2006.01)
(52) U.S. Cl.
CPC .............................. *G06F 17/30917* (2013.01)
USPC .......................................................... 707/769
(58) Field of Classification Search
USPC .......................................................... 707/769
See application file for complete search history.

(56) References Cited

U.S. PATENT DOCUMENTS

| | | | |
|---|---|---|---|
| 5,485,550 A | 1/1996 | Dalton | |
| 5,721,911 A | 2/1998 | Ha et al. | |
| 6,631,497 B1 | 10/2003 | Jamshidi et al. | |
| 6,662,340 B2* | 12/2003 | Rawat et al. | 715/236 |
| 7,017,112 B2* | 3/2006 | Collie et al. | 715/212 |
| 7,254,581 B2 | 8/2007 | Johnson et al. | |
| 7,685,204 B2 | 3/2010 | Rogers | |
| 8,107,126 B2* | 1/2012 | Watanabe | 358/1.9 |
| 8,402,001 B1* | 3/2013 | Tovo | 707/682 |
| 8,601,361 B2* | 12/2013 | Berger et al. | 715/227 |
| 2002/0083096 A1* | 6/2002 | Hsu et al. | 707/513 |
| 2005/0060324 A1 | 3/2005 | Johnson et al. | |
| 2005/0165819 A1* | 7/2005 | Kudoh et al. | 707/101 |
| 2005/0251812 A1 | 11/2005 | Hayward | |
| 2005/0267899 A1* | 12/2005 | Gupta et al. | 707/100 |
| 2006/0123010 A1 | 6/2006 | Landry et al. | |
| 2009/0044095 A1* | 2/2009 | Berger et al. | 715/226 |
| 2009/0132942 A1* | 5/2009 | Santoro et al. | 715/765 |
| 2009/0157679 A1* | 6/2009 | Elias et al. | 707/6 |
| 2009/0195823 A1* | 8/2009 | Watanabe | 358/1.15 |
| 2009/0327213 A1* | 12/2009 | Choudhary | 707/2 |

OTHER PUBLICATIONS

Stinson et al., "Microsoft Office Excel 2003", Microsoft Press, Sep. 3, 2003, pp. 685-692.
CardScan User's Guide; 2002; Corex Technologies Corporation; pp. 1-1 to 11-2.
Getting Started with CardScan; 2006; CardScan, Inc.; pp. 1 to 5-2.

* cited by examiner

*Primary Examiner* — Noosha Arjomandi
(74) *Attorney, Agent, or Firm* — Fletcher Yoder PC (57) ABSTRACT

Automatically generating and/or populating a table is described. In some embodiments, in response to receiving an indication to include data from a set of documents in a table, each of at least a subset of documents included in the set of documents is parsed to identify a set of one or more common elements, a table with a structure derived from at least a subset of the set of common elements is generated, and an entry for each of one or more documents in the set of documents included in the table is populated with data values extracted from the content of that document.

15 Claims, 8 Drawing Sheets

AUTO-POPULATION OF A TABLE

BACKGROUND OF THE INVENTION

Typically, data must be manually entered into a table. Manual entry of large amounts of data into a table is not only time consuming but is prone to human error.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims, and the invention encompasses numerous alternatives, modifications and equivalents. Numerous specific details are set forth in the following description in order to provide a thorough understanding of the invention. These details are provided for the purpose of example, and the invention may be practiced according to the claims without some or all of these specific details. For the purpose of clarity, technical material that is known in the technical fields related to the invention has not been described in detail so that the invention is not unnecessarily obscured.

Automatically generating and/or populating a table is described. In some embodiments, in response to receiving an indication to include data from a set of documents in a table, each of at least a subset of documents included in the set of documents is parsed to identify a set of one or more common elements, a table with a structure derived from at least a subset of the set of common elements is generated, and an entry for each of one or more documents in the set of documents included in the table is populated with data values extracted from the content of that document.

Although many of the examples provided herein are with respect to a particular spreadsheet application, the techniques described herein may be employed with respect to any application, spreadsheet or otherwise. The workspace of the spreadsheet application described in some of the examples herein comprises an infinite or seemingly infinite canvas on which one or more finite objects, such as tables, text, charts, graphs, shapes, images, photographs, graphics, animations, multimedia content, etc., may be placed. However, the techniques disclosed herein are not limited to use in a spreadsheet or other application having such a workspace. Depending on its type, an object may have at least standard spreadsheet functionality associated with it. For example, a table object is comprised of a desired or fixed number of rows and columns of cells which are associated with at least standard spreadsheet functionality associated with cells. The term "at least standard spreadsheet functionality" in the context of cells of a table includes the ability to define the content of one cell in such a way that the content of the one cell is determined based at least in part on the content of one or more other cells of the same table or different tables, and the content of the one cell is updated automatically without further human action if the content of one or more of the one or more other cells is changed. In some embodiments, a table object may include one or more header rows and/or header columns, and values may be manually and/or automatically entered into one or more header cells, e.g., to label an associated column or row. The techniques disclosed herein are not limited to use with respect to such table objects and may be similarly employed with respect to any other table and/or cell configurations or organizations, such as the seemingly infinite single grid or table of cells in each sheet of some typical spreadsheet applications that includes an unlimited or very large number of rows and columns of cells. In some embodiments, the described techniques may be employed with respect to a table or table object that is or is to be embedded in a document of a different (i.e., non-spreadsheet) application. Although the given examples are described with respect to automatically generating and/or populating tables, the techniques described herein may be similarly employed to automatically generate and/or populate other types of objects such as, e.g., charts or graphs. The examples provided herein are described with respect to documents; however, the disclosed techniques may be similarly employed with respect to any file type, data object, and/or data structure. For example, the disclosed techniques may be employed with respect to media files such as audio files, image files, video files, etc.

As used herein, the term "content" of a document refers to the data of a document comprising the body of the document and is different from other data, such as metadata, that may be associated with the document. In some cases, the metadata associated with a document, if any, may at least in part be the same as or reflect the content of the document. In some cases, the metadata may at least in part provide other information such as the properties of a document. For example, the content of a word processing or text document is typically different than the metadata associated with the document, if any, which may comprise values for properties such as author, date and time of creation, file size, time of last modification, etc.

Figure 1:
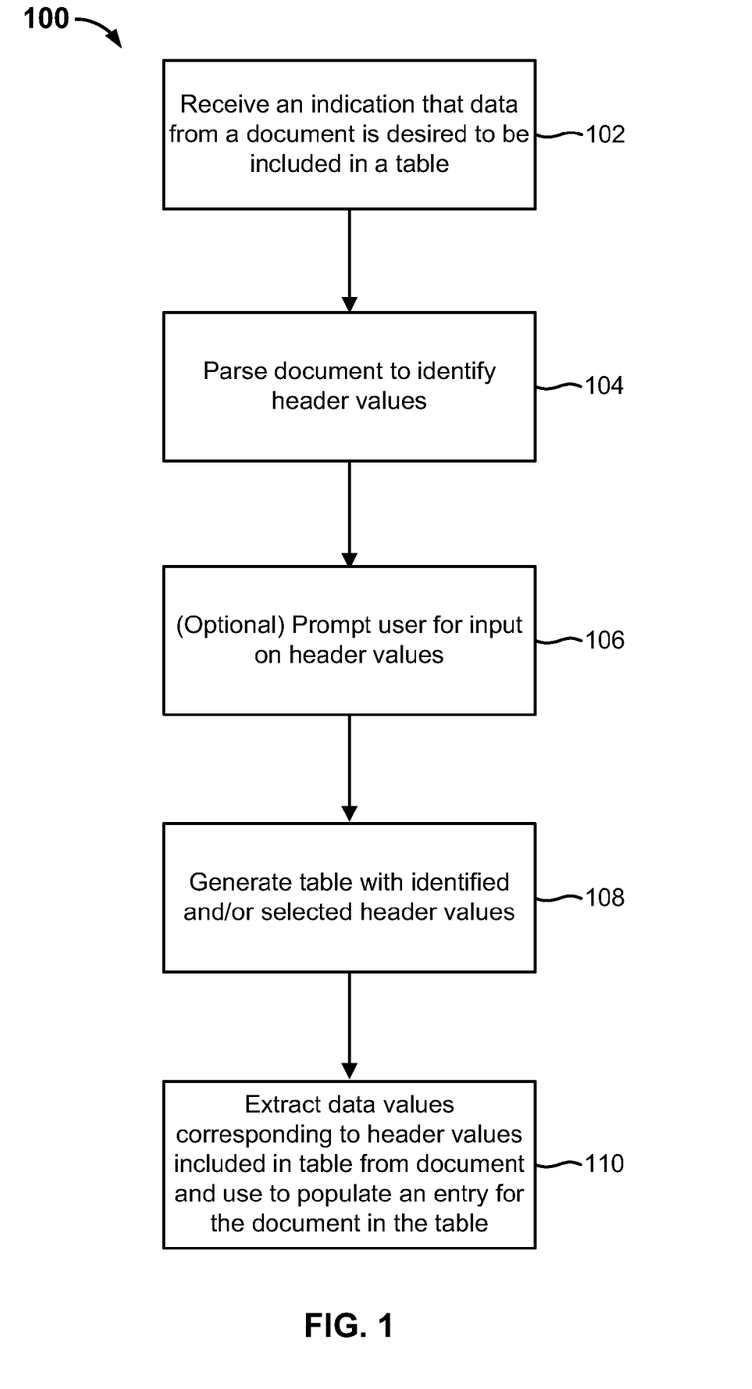
FIG. 1 is a flow chart illustrating an embodiment of a process for generating and populating a table based on the structure and/or content of a document.

FIG. 1 is a flow chart illustrating an embodiment of a process for automatically generating and populating a table based on the content of a document. For example, the format and/or structure of a generated table is based at least in part on one or more elements of the document itself, and in various embodiments the one or more elements may comprise content and/or metadata of the document. In some embodiments, process 100 is employed with respect to FIGS. 3A-3D. Process 100 starts at 102 at which an indication that data from a document is desired to be included in a table is received. In various embodiments, the indication of 102 may be received, for example, in response to an icon associated with the document being dragged and dropped into a spreadsheet workspace or on an icon of the spreadsheet application and/or in response to the document otherwise being selected and/or opened with respect to the spreadsheet application.

At 104, the document is parsed to identify header values, e.g., that can be used to populate header cells of a table. For example, the content of the document and/or metadata of the document may be parsed at 104. In various embodiments, any appropriate search techniques and/or search criteria may be employed to identify header values at 104.

In some embodiments, a value is selected as a header value only if at least one associated data value can also be identified for the header value. For instance, a value may be selected as a header value if associated text and/or other content immediately follows the header value or formatting (e.g., a carriage return) or punctuation (e.g., a colon) associated with the header value.

In some embodiments, one or more keywords of the document may be identified as header values at 104. In some cases, keywords may be extracted from a prescribed section of the document, such as the heading or a beginning portion of the document. In some cases, keywords may be selected based on the number of occurrences of the keyword in the document or one or more prescribed sections or portions of the document.

In some embodiments, the structure and/or formatting of the document is parsed to determine header values at 104. In some cases, one or more document headings may be selected as header values. In some cases, text with special formatting or formatting associated with emphasis (e.g., bold, italicized, underlined, capitalized, different font style and/or size, etc.) may be identified as header values.

In some embodiments, one or more metatags associated with metadata of the document may be selected as header values at 104. In some embodiments, header values are at least in part automatically identified at 104. In other embodiments, header values may be identified at 104 based at least in part on user input. For example, a user may specify in preferences and/or may be prompted to specify one or more search terms or values at 104. In some such cases, user-specified search terms or values (or their equivalents) found in the document may be identified as header values at 104. In such embodiments, the user may specify equivalent values and/or permutations of the search terms and/or such values may be automatically learned.

At 106, a user may be optionally prompted for input on the header values identified at 104. For example, a pop-up window or other interface may be presented to the user from which the user can select all or a subset of the header values identified at 104 to be included in a table. The user may also be provided options to modify the header values, add new header values, sort the header values, etc. Alternatively, the user may not be prompted at all, and header values may be automatically selected, e.g., based on preferences, matches, properties, past selections, etc.

At 108, a table with the header values identified at 104 and/or selected at 106 is generated. For example, the header values may be employed to populate one or more header rows and/or columns of the table.

At 110, the data values corresponding to the header values of the table are extracted from the document and used to populate an entry of the document in the table, wherein a cell of the entry is populated with a data value that corresponds to the associated header cell value of that cell. That is, data values of an entry are appropriately placed or aligned with respect to the header values of the table. In various embodiments, data values may be extracted at 110 from the content of the document and/or from metadata associated with the document. An entry of the document in the table may comprise a row or column of the table.

Figure 2:
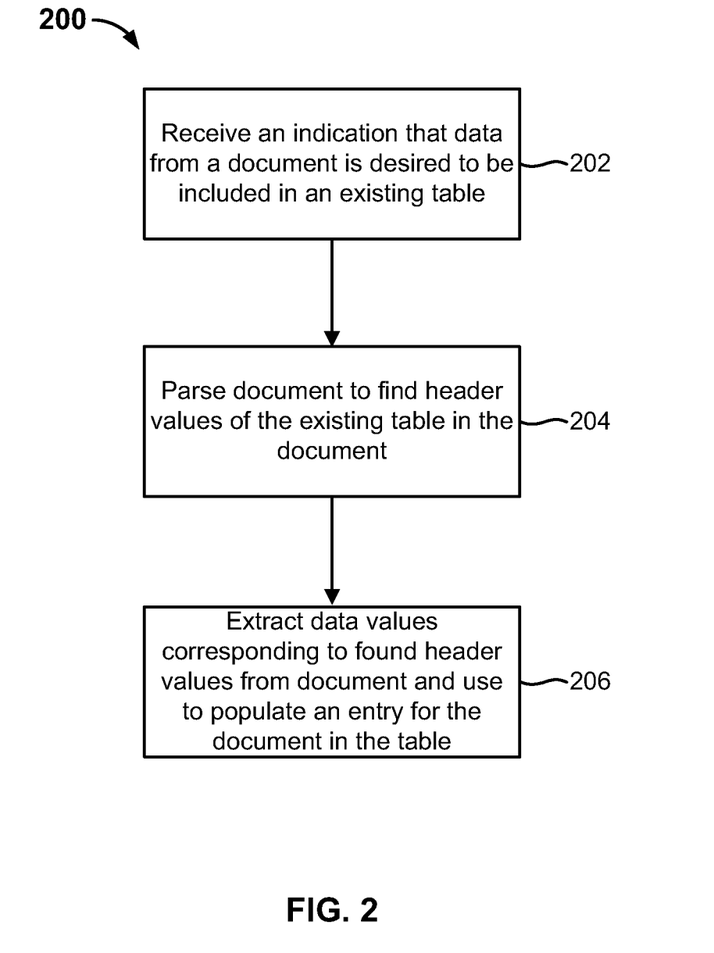
FIG. 2 is a flow chart illustrating an embodiment of a process for adding an entry for a document in an existing table.

FIG. 2 is a flow chart illustrating an embodiment of a process for automatically adding an entry for a document in an existing table. In some embodiments, process 200 is employed with respect to FIGS. 3E-3G. In various embodiments, the document whose data is desired to be added to the table using process 200 may comprise the same type of document in structure and/or content used to generate the existing table or may comprise a different type of document in structure and/or content that includes at least some of the same type of data. Process 200 starts at 202 at which an indication that data from a document is desired to be included in an existing table is received. For example, the indication of 202 may be received in response to an icon associated with the document being dragged and dropped onto an existing table and/or in response to the document otherwise being selected and/or opened with respect to the existing table.

At 204, the document is parsed to find header values of the existing table in the document. For example, the content of the document and/or metadata of the document may be parsed at 204. Any appropriate searching and/or matching algorithm to find the header values of the existing table in the document may be employed. In some cases, for instance, a particular header value may be searched in the document using a user-specified and/or automatically generated match list comprising equivalent terms and/or variations of the header value.

At 206, data values associated with the header values that were found in the document at 204 are extracted and used to populate an entry of the document in the table, wherein a cell of the entry is populated with a data value that corresponds to the associated header cell value of that cell. That is, data values of the entry are appropriately placed or aligned with respect to the header values of the table. In various embodiments, data values may be extracted from the content of the document and/or from metadata associated with the document. In some cases, all header values of the existing table (or equivalents thereof) may not be found in the document at 204, and in such cases, only data values corresponding to those header values that were found in the document are used to populate the entry of the document in the table at 206. In some embodiments, when data values associated with the document are entered into the existing table, e.g., at 206, no existing data included in the table is altered or affected in any way. In some embodiments, parsing the document at 204 includes identifying one or more other relevant header values for inclusion as additional new columns and/or rows in the existing table. In such cases, a user may optionally be prompted to provide search terms or values (or their equivalents) to identify additional potential header values and/or may optionally be prompted to approve, select from, and/or modify additional identified header values for inclusion in the existing table. In some embodiments, if no matches to the header values of the existing table are found in the document at 204, an entry for the document is not created in the existing table at 206. In some such cases, a new table may be automatically generated for the document, e.g., using process 100 of FIG. 1. In various embodiments, process 200 may be employed with respect to a single document or with respect to each of a plurality of documents, e.g., if a group of selected documents and/or a folder comprising a plurality of documents is dragged and dropped onto an existing table such as described with respect to FIGS. 5E-5F.

FIGS. 3A-3G illustrate an embodiment of automatically generating and populating a table from content included in a document.

Figure 3A:
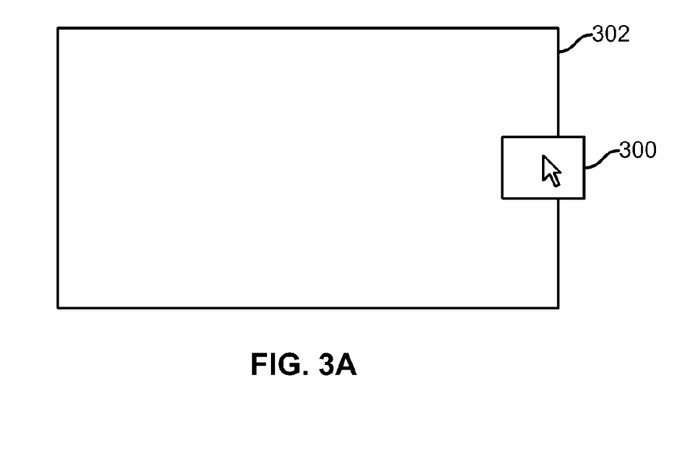
FIGS. 3A-3G illustrate an embodiment of automatically generating and populating a table from content included in a document.

FIG. 3A illustrates dragging an icon of a document 300 onto an empty sheet or canvas 302 of a spreadsheet application.

Figure 3B:
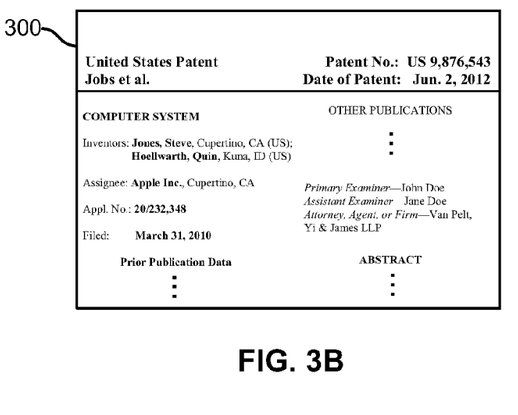

FIG. 3B illustrates a portion of the content of document 300, which in this example comprises a PDF file of an issued patent. In some embodiments, a list of values to search for in document 300 is provided or specified by a user, e.g., with respect to user preferences or in response to being prompted (not shown in the given example). Alternatively or additionally, an analysis of the document may be performed to at least in part automatically make a determination of header values. A list of potential header values is identified from parsing the content and/or metadata of document 300. In various embodiments, the content, metadata, and/or both the content and metadata of the document may be parsed and used to select header values.

Figure 3C:
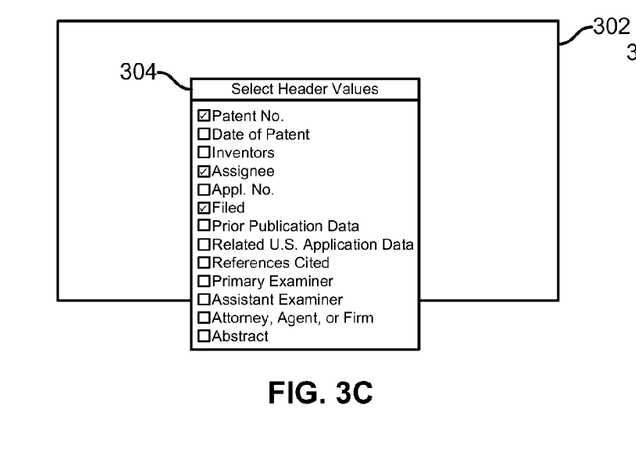

FIG. 3C illustrates presentation of a list of potential header values to a user via interface 304 so that the user can select the header values to be included in a table. As depicted, the user has selected "Patent No.", "Assignee", and "Filed" from the list of potential header values provided via interface 304. In various embodiments, other user preferences may also be specified via interface 304 or another interface, such as an order for the selected headers, a sort strategy, etc.

Figure 3D:
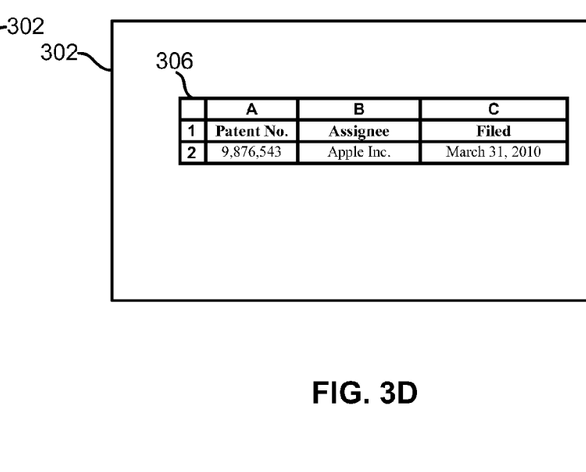

FIG. 3D illustrates generation of table 306 with the header values selected via interface 304 in the header row (i.e., row 1) of table 306 and with a record or entry for document 300 in row 2 of table 306. In other embodiments, the header row may comprise the top row of table 306, e.g., in place of A, B, and C in table 306 (not shown in the given example). Each cell of row 2 is populated with a data value extracted from document 300 that corresponds to the associated header cell value. In some cases, multiple data values of a document may correspond to a particular header cell value. For example, if the given table included an "Inventors" column, multiple values may be entered into a cell of that column, if applicable. In alternative embodiments, a table may be expanded to include a plurality of columns (or rows) for a particular header cell value or type. For example, an "Inventor" column may be expanded into a plurality of columns such as "Inventor(1)", "Inventor(2)", etc., to accommodate a plurality of inventor data values. Other examples of multiple data sets with respect to an issued patent such as document 300 include class/subclass, cited art, etc. In some embodiments, user selection of header values via interface 304 is optional. In the cases in which the user does not select and/or specify header values, all or a subset of the header values automatically identified from parsing document 300 may be included in table 306, and the associated data values of document 300 may be included in corresponding cells of row 2 of table 306 (not shown in the given example).

Figure 3E:
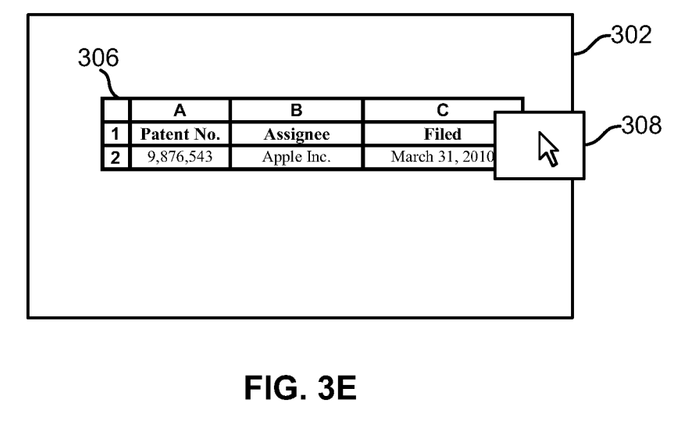

FIG. 3E illustrates dragging an icon of another document 308 onto existing table 306. In various embodiments, document 308 may be of the same or of a different type in structure and/or content than the document used to generate table 306, i.e., document 300 in the given example. For example, in the illustrated example of an issued patent, other types of documents may include patent publications, patent applications, patent summaries, patent status sheets, etc.

Figure 3F:
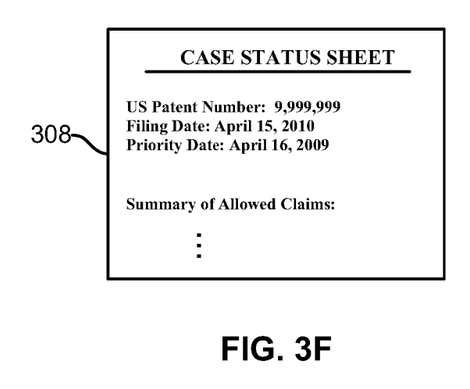

As depicted in FIG. 3F, document 308 is of a different type and comprises a text document. Document 308 is parsed to find the header values of table 306 (or equivalents thereof) in the document and the associated data values. A matching algorithm that equates synonymous values such as "Patent No." and "Patent Number" and "Filed" and "Filing Date" may be employed. No match is found for the "Assignee" header value of table 306 in document 308.

Figure 3G:
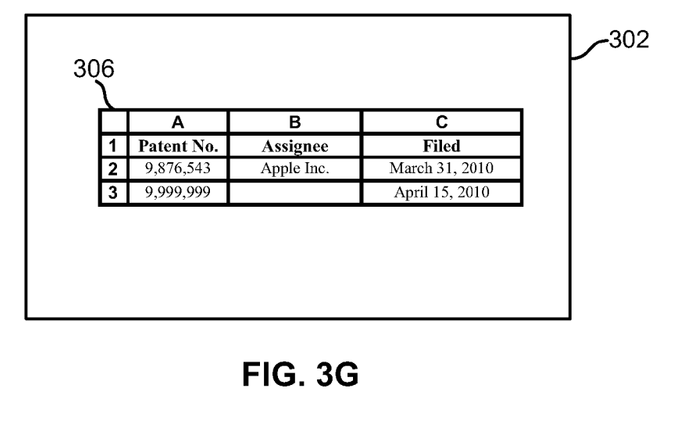

FIG. 3G illustrates an updated version of table 306 that includes a record or entry for document 308, i.e., row 3 of table 306. Each cell of the entry is populated with a data value extracted from document 308 that corresponds to the associated header cell value. Since no match was found for the "Assignee" header value of table 306, the corresponding cell B3 is left empty. In some embodiments, one or more relevant header values other than those of table 306 may be identified while parsing document 308 and included as additional (possibly hidden) columns in table 306 so that, e.g., the data included in document 308 may be more completely represented in table 306 (not shown in the given example).

In one example, a document may include a list of keywords. In such cases, one or more of these keywords may be selected as header values, and then other documents may be searched to find similar keywords or appropriate keywords for those documents such that a cell is not left empty but rather filled with data.

As should be appreciated, adding documents of the same type or different type may be further added to the example shown in FIGS. 3A-3G. Furthermore, it should be understood that it is not limited to a single entry at a time and that multiple documents can be dragged over in one or more operations in order to populate the sheet or table.

Any of the various techniques for generating and populating a new table based on the data comprising a single document and/or adding and populating an entry for a single document into an existing table as described above with respect to FIGS. 1, 2, and 3A-3G may be similarly extended to a set of documents, as further described with respect to FIGS. 4 and 5A-5F below.

With respect to a set of documents, for example, metadata may be extracted from one document, and other documents may be searched for content that is related to the metadata or that is someway related to preferences or includes some other indication of value. In some cases, all of or a subset of documents of a set of documents may be reviewed and compared to find best matches in order to make an appropriate determination of the header values.

Figure 4:
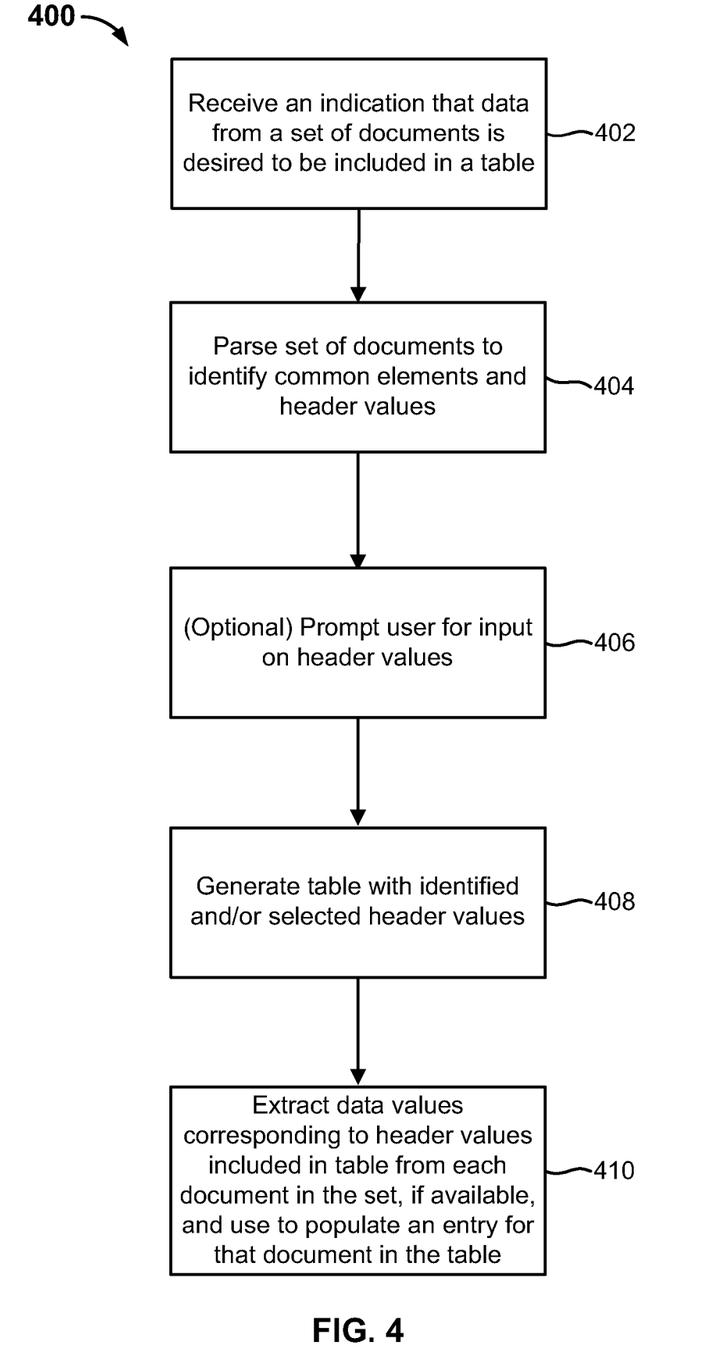
FIG. 4 is a flow chart illustrating an embodiment of a process for generating and populating a table based on the structure and/or content of a plurality of documents.

FIG. 4 is a flow chart illustrating an embodiment of a process for automatically generating and populating a table based on the content of a plurality of documents. For example, the format and/or structure of a generated table is based at least in part on one or more (common) elements of the documents, and in various embodiments the one or more elements may comprise content and/or metadata of the documents. In some embodiments, process 400 is employed with respect to FIGS. 5A-5D. Process 400 starts at 402 at which an indication that data from a set of documents is desired to be included in a table is received. In various embodiments, the indication of 402 may be received, for example, in response to an icon associated with a folder of documents and/or a selected batch or group of documents being dragged and dropped into a spreadsheet workspace or on an icon of the spreadsheet application and/or in response to the documents otherwise being selected and/or opened with respect to the spreadsheet application. In various embodiments, the set of documents may comprise the same or different types of documents in structure and/or content. In some cases, at least a majority of documents in the set includes at least one common element.

At 404, the set of documents is parsed to identify common elements, if any, amongst the documents or a subset of documents and identify header values, e.g., that can be used to populate header cells of a table. For example, the content and/or metadata of each of the documents included in the set or a subset thereof may be parsed at 404. In some embodiments, the common elements identified at 404 comprise potential header values. In various embodiments, any appropriate search techniques and/or search criteria may be employed to identify header values at 404, some examples of which were described with respect to step 104 of process 100 of FIG. 1. Moreover, any appropriate matching algorithm and/or criteria may be employed to identify common elements (e.g., common terms or keywords) across the set of documents or a subset thereof. Furthermore, any other appropriate techniques may be employed to determine header values at 404. For instance, the system may be capable of inferring a header value from data included in the documents. In one example, if it can be determined that "Charles Barkley" and "Michael Jordan" are basketball players, e.g., by referring to an external source or by inference of the documents being scanned, a "Basketball Player" header value may be automatically identified even if the term "Basketball Player" is not explicitly found in the documents. In various embodiments, header values may be identified at 404 from a prescribed document, a prescribed document type, a prescribed subset of documents or document types, averaged content of all documents in the set, etc. In some cases, a user may specify the documents or document types from which to identify header values, e.g., with respect to user preferences or in response to being prompted. In some embodiments, header values are identified at 404 from the more structured documents included in the set.

At 406, a user may be optionally prompted for input on the header values identified at 404. For example, a pop-up window or other interface may be presented to the user from which the user can select all or a subset of the header values to be included in a table. The user may also be provided with options to modify the header values, add new header values, sort the header values, etc. Alternatively, various calculations may be conducted behind the scenes.

At 408, a table with the header values identified at 404 and/or selected at 406 is generated. For example, the header values may be employed to populate one or more header rows and/or columns of the table.

At 410, the data values corresponding to the header values of the table are extracted from each document in the set, if available, and used to populate an entry of that document in the table, wherein a cell of the entry is populated with a data value that corresponds to the associated header cell value of that cell. That is, data values of an entry are appropriately placed or aligned with respect to the header values of the table. In various embodiments, data values may be extracted from the content of and/or from metadata associated with a document. In some embodiments, the header values identified at 404 and/or selected at 406 and/or their equivalents may be employed as search terms to identify similar data in other (e.g., unrelated or different types of) documents or files included in the set. In some embodiments, entries for one or more documents or files included in the set that are unrelated to or different from (e.g., a majority of) the documents or types of documents used to identify header values at 404 may not be included in the table at 410. Alternatively, in some cases, possibly sparsely populated entries for such documents or files may be included in the table based on the data available with respect to each document or file.

FIGS. 5A-5F illustrate an embodiment of automatically generating and populating a table from content included in a plurality of documents.

Figure 5A:
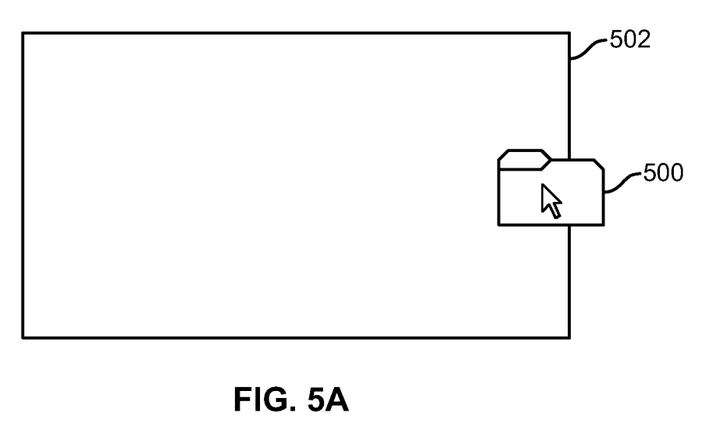
FIGS. 5A-5F illustrate an embodiment of automatically generating and populating a table from content included in a plurality of documents.

FIG. 5A illustrates dragging an icon of a folder 500 of documents onto an empty sheet or canvas 502 of a spreadsheet application. In various embodiments, folder 500 may include documents of the same and/or different types in structure and/or content. Alternatively, it may be a group of selected documents and/or folders.

Figure 5B:
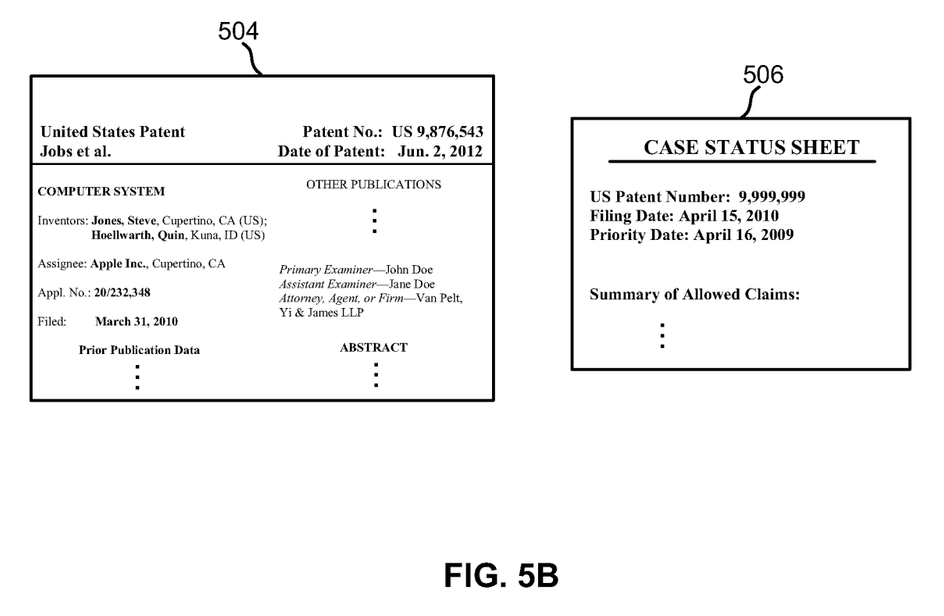

FIG. 5B illustrates portions of two different types of documents 504 and 506 included in folder 500. In the given example, documents of type 504 in folder 500 comprise PDFs of issued patents, and documents of type 506 in folder 500 comprise text files. The documents included in folder 500 are parsed and compared to identify common elements, if any, and to identify header values. In some embodiments, the identified common elements comprise potential header values. In some embodiments, header values and/or equivalent values to search for in the documents of folder 500 are provided or specified by a user, e.g., with respect to preferences or in response to being prompted (not shown in the given example). A list of potential header values is identified from parsing and comparing the content and/or metadata of the documents in folder 500. In some embodiments, header values are identified from one or more of the most structured document types included in folder 500; for example, metatags associated with metadata of a PDF document may be selected as header values and used to search for equivalent data in a less structured document, e.g., the content of a text document that does not include the same metatags and/or metadata (not shown in the given example).

Figure 5C:
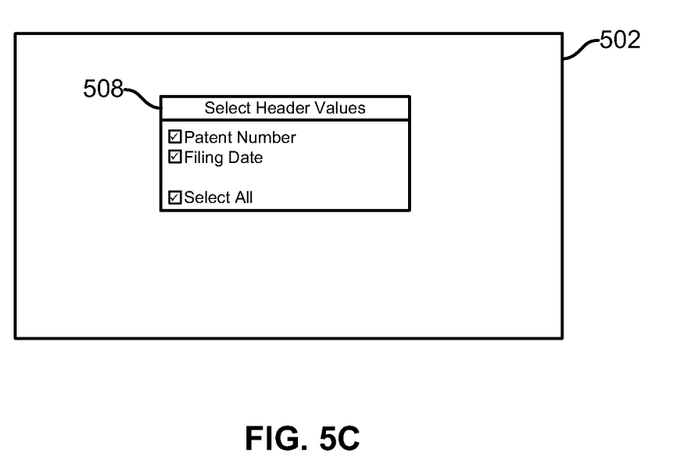

FIG. 5C illustrates presentation of a list of potential header values to a user via interface 508 so that the user can select the header values to be included in a table. In the given example, the default list includes only common elements (e.g., the intersection of potential header values) identified in all or a majority of the documents included in folder 500. The matching algorithm employed to determine common elements equates "Patent No." and "Patent Number" and "Filed" and "Filing Date" in this example. As depicted, the user has "Selected All" of the list of potential header values provided via interface 508. In alternative embodiments, a comprehensive list of potential header values that includes the union of identified header values across the set of documents or subset thereof may be provided via interface 508, for example, with the header values common to all or at least a subset (e.g., a majority) of documents automatically selected (e.g., checked) in interface 508. In various embodiments, other user preferences may also be specified via interface 508 or another interface, such as an order for the selected headers, a sort strategy, etc.

Figure 5D:
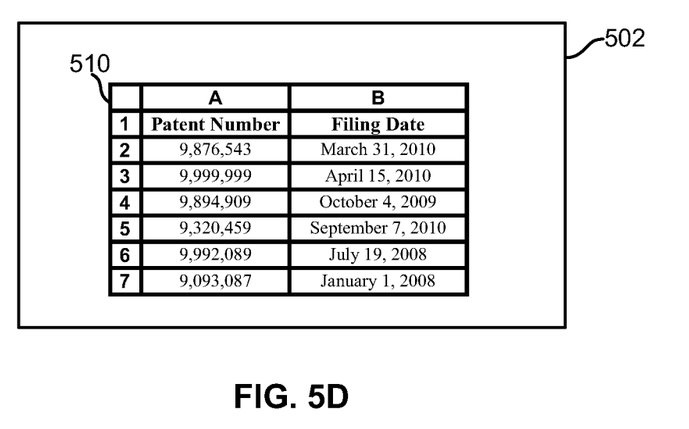

FIG. 5D illustrates generation of table 510 with the header values selected via interface 508 in the header row (i.e., row 1) of table 510 and with a record or entry for each document included in folder 500 in rows 2-7. Each cell of the entry (i.e., row) of a document is populated with a data value extracted from that document that corresponds to the associated header cell value. In the given example, folder 500 includes six documents. Thus, six rows of table 510 are populated, with each row corresponding to a particular document in folder 500. In some embodiments, user selection of header values via interface 508 is optional. In the cases in which the user does not select and/or specify header values, all or a subset of the header values automatically identified from parsing the documents may be included in table 510, and the associated data values of each document may be included in corresponding cells (not shown in the given example).

Figure 5E:
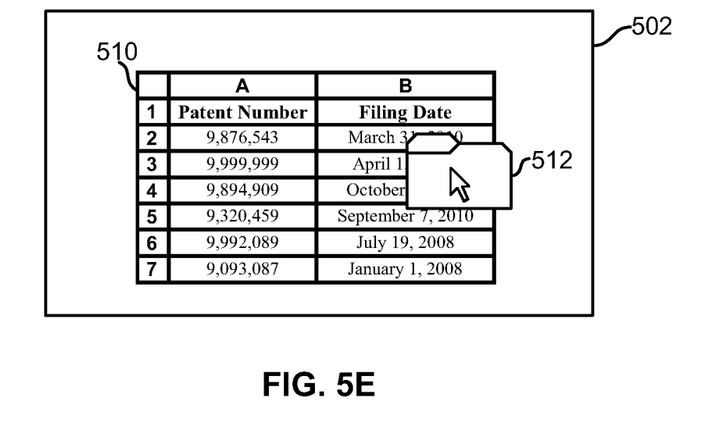

FIG. 5E illustrates dragging an icon of another folder 512 of documents onto existing table 510. In various embodiments, the files in folder 512 may be of the same or of a different type in structure and/or content than the documents or document types used to generate table 510, i.e., documents types 504 and 506. In the given example, folder 512 includes a large number of PDF files of issued patents, such as 504 of FIG. 5B. Each of the documents in folder 512 is parsed to find the header values of table 510 (or equivalents thereof) in the document and the associated data values, if available.

Figure 5F:
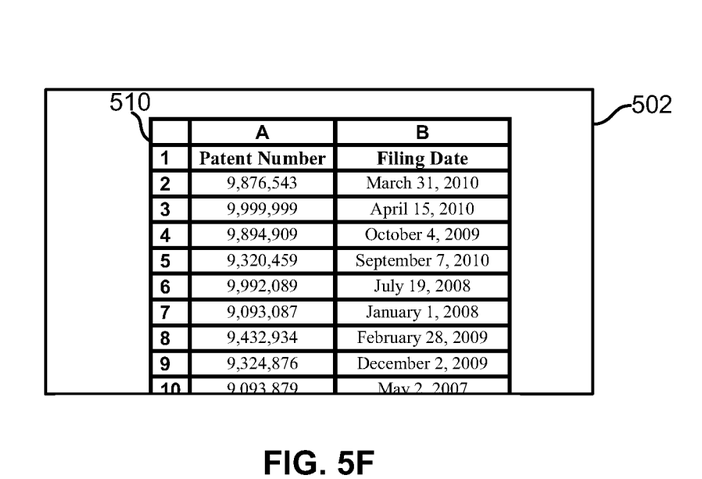

FIG. 5F illustrates an updated version of table 510 that includes a record or entry for each document of folder 512.

In some embodiments, the documents may comprise spreadsheets and/or tables themselves. In one embodiment, multiple spreadsheets are dragged over a spreadsheet icon, and the spreadsheets are parsed to generate an overall spreadsheet or table that includes all or a portion of the data from the individual sheets. In another embodiment, a set of documents may comprise spreadsheets and documents other than spreadsheets, such as PDF or text documents. In this embodiment, the spreadsheet may serve as a template for extracting information from the documents, or alternatively data comprising the best fit or match across all or a majority of documents in the set may be extracted. In some embodiments, user input, e.g., from user preferences or received in response to prompting a user, may be employed to determine the data to be included in the table or spreadsheet.

In some embodiments, although only certain data sets may be displayed, other information about the documents may be retained behind the scenes, e.g., as hidden rows and/or columns. Thus, if a user wants to add other headers to a table, the user can simply select the desired headers from all of the headers available with respect to the table. In addition, such information may be used when other documents are added. For example, in order to find the most appropriate data, all header values available may be compared rather than just the current headers displayed in the spreadsheet or table.

As described herein, a table may be automatically generated for and/or populated with data comprising one or more documents or files. The disclosed techniques are especially useful to automatically identify common subject matter across a plurality of documents or files and enter data from at least a subset of the plurality of documents or files into a table.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for automatically populating a table, comprising:
   a processor configured to:
      receive an indication to include into a table data from a first document and a second document;
      parse the first document and the second document to identify a set of one or more common elements that are included in each of the first document and the second document by searching the first document and the second document for a prescribed set of elements, wherein the prescribed set of elements comprises a user-specified query by which to search the first document and the second document;
      present a prompt to select at least a subgroup of common elements from among the identified set of the one or more common elements, wherein the subgroup of common elements is selected to be header values of a corresponding subset of the identified set of the one or more common elements;
      generate the table, wherein the table comprises the selected header values comprising or derived from at least the subset of the set of the one or more common elements; and
      populate an entry into the table for each of the first document and the second document comprising data extracted from content of the first document and the second document, wherein each entry is aligned in the table with respect to corresponding header values of the table; and
   a memory coupled to the processor and configured to provide the processor with instructions.

2. The system recited in claim 1, wherein the first document and the second document comprise documents of different types.

3. The system recited in claim 1, wherein the processor is configured to parse either or both of the content and metadata of the first document and the second document.

4. The system recited in claim 1, wherein the processor is configured to parse documents of a particular type.

5. The system recited in claim 1, wherein the first document and the second document are specified by a user.

6. The system recited in claim 1, wherein the header values are at least in part specified or selected by a user.

7. The system recited in claim 1, wherein the table comprises a plurality of rows and columns configured to receive the entry.

8. A computer program product for automatically populating a table, the computer program product being embodied in a non-transitory computer readable storage medium and comprising computer instructions to:
   receive an indication to include into a table data from a first document and a second document;
   parse the first document and the second document to identify a set of one or more common elements that are included in each of the first document and the second document by searching the first document and the second document for a prescribed set of elements, wherein the prescribed set of elements comprises a user-specified query by which to search the first document and the second document;
   determine header values to be included within the table from a user selection of at least one of the identified set of the one or more common elements;
   generate the table, wherein the table comprises the header values comprising or derived from the at least one of the identified set of the one or more common elements; and
   populate an entry into the table for each of the first document and the second document comprising data extracted from content of the first document and the second document, wherein each entry is aligned in the table with respect to corresponding header values of the table.

9. The computer program product recited in claim 8, wherein the first document and the second document comprise documents of different types.

10. The computer program product recited in claim 8, wherein the computer instructions comprise instructions to parse either or both of the content and metadata of the first document and the second document.

11. The computer program product recited in claim 8, wherein the computer instructions comprise instructions to parse documents of a particular type.

12. A method for automatically populating a table, comprising:
- receiving via a processor of an electronic device an indication to include into a table presented on the electronic device data from a first document and a second document;
- parsing the first document and the second document to identify a set of one or more common elements that are included in each of the first document and the second document, wherein parsing the first document and the second document to identify the set of one or more common elements comprises searching the first document and the second document for a prescribed set of elements, and wherein the prescribed set of elements comprises a user-specified query by which to search the first document and the second document;
- presenting a user-selectable list of available header values, wherein the user-selectable list of available header values comprises at least a subgroup of the identified set of the one or more common elements;
- receiving a user selection of header values from the user-selectable list of available header values;
- generating the table, wherein the table comprises the selected header values comprising or derived from at least a subset of the identified set of the one or more common elements; and
- populating an entry into the table for each of the first document and the second document comprising data extracted from content of the first document and the second document, wherein each entry is aligned in the table with respect to corresponding header values of the table.

13. The method recited in claim 12, wherein parsing comprises parsing either or both of the content and metadata of the first document and the second document.

14. The method recited in claim 12, wherein parsing the first document and the second document comprises parsing documents of a particular type.

15. The method recited in claim 12, wherein receiving the indication comprises receiving a user operation including a drag and drop of the first document and the second document onto one more areas of a spreadsheet presented on the electronic device.

* * * * *